(12) United States Patent
Scartozzi et al.

(10) Patent No.: US 7,726,001 B2
(45) Date of Patent: Jun. 1, 2010

(54) METHOD OF MANUFACTURING A COUPLING ASSEMBLY

(75) Inventors: Giulio Scartozzi, Chicago Heights, IL (US); Edward Mild, Duluth, MN (US)

(73) Assignee: Allied Tube & Conduit Corporation, Harvey, IL (US)

( * ) Notice: Subject to any disclaimer, the term of this patent is extended or adjusted under 35 U.S.C. 154(b) by 0 days.

(21) Appl. No.: 12/144,735

(22) Filed: Jun. 24, 2008

(65) Prior Publication Data

US 2008/0250623 A1   Oct. 16, 2008

Related U.S. Application Data

(62) Division of application No. 10/328,077, filed on Dec. 23, 2002, now Pat. No. 7,404,582.

(51) Int. Cl.
*B21D 39/04* (2006.01)
*B23P 11/00* (2006.01)
*B21C 37/06* (2006.01)
*F16L 21/00* (2006.01)

(52) U.S. Cl. ............... 29/524.1; 29/525.02; 29/525.11; 285/404; 72/368

(58) Field of Classification Search ............... 29/524.1, 29/525.02, 525.11, 557, 781, 782, 819; 285/404; 72/368, 370.03, 370.1, 370.27
See application file for complete search history.

(56) References Cited

U.S. PATENT DOCUMENTS

| 653,384 | A | 7/1900 | Grove |
|---|---|---|---|
| 866,184 | A | 9/1907 | Brison |
| 869,086 | A | 10/1907 | Hoffman |
| 2,147,209 | A | 2/1939 | Olson |
| 2,455,180 | A | 11/1948 | Kennedy |
| 3,221,792 | A | 12/1965 | Poupitch |
| 3,451,033 | A | 6/1969 | Flachbarth |
| 3,454,291 | A | 7/1969 | Eidelberg et al. |
| 3,803,667 | A | 4/1974 | Rose |
| 4,547,004 | A | 10/1985 | Goldberg |
| 4,592,574 | A | 6/1986 | Vollmuth et al. |
| 4,741,081 | A * | 5/1988 | Redman ................ 29/890.148 |
| 4,957,314 | A | 9/1990 | Basile et al. |
| 5,533,849 | A | 7/1996 | Burdick |
| 6,581,433 | B2 * | 6/2003 | Otsuka et al. ............ 72/370.06 |
| 6,715,803 | B1 | 4/2004 | Pahl |
| 6,749,386 | B2 | 6/2004 | Harris |
| 2002/0129635 | A1* | 9/2002 | Dole ............................. 72/70 |
| 2003/0047946 | A1 | 3/2003 | Ohanesian |

FOREIGN PATENT DOCUMENTS

JP   56-129515 A1   10/1981

OTHER PUBLICATIONS

Allied Tube & Conduit Corporation, Kwik-Couple Factory-installed on rigid & IMC conduit and elbows, catalog, dated Oct. 1998 (ATC-L-1559-3).
Allied Tube & Conduit Corporation, Specifications for Kwik-Fit EMT, catalog, dated Apr. 1995 (ATC-L-1419-4).

* cited by examiner

*Primary Examiner*—Jermie E Cozart

(57) ABSTRACT

A coupling system for conduit and pipe for carrying insulated electrical cable, more particularly, a conduit coupling assembly for connecting multiple lengths of conduit in coaxial relationship.

2 Claims, 5 Drawing Sheets

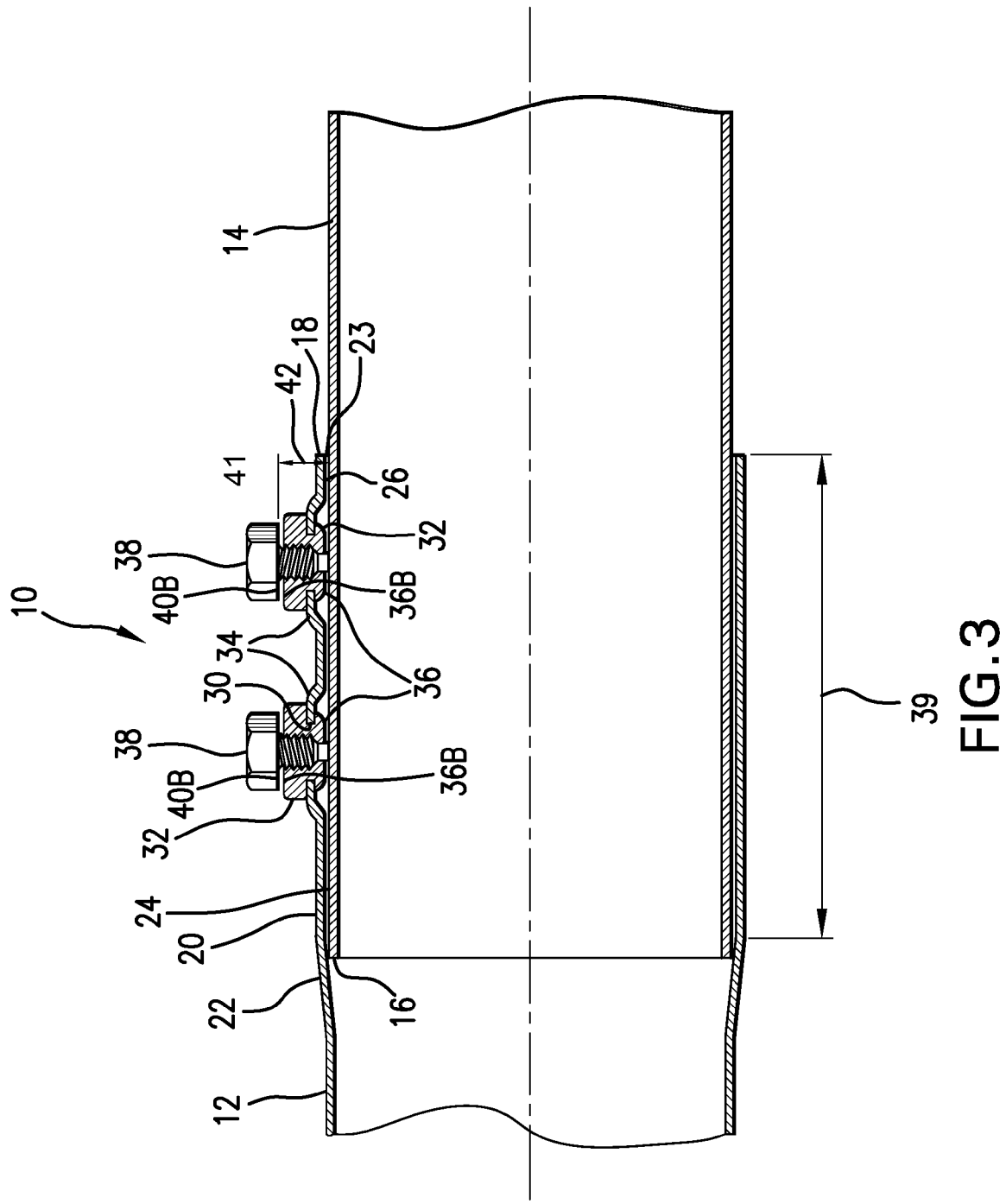

METHOD OF MANUFACTURING A COUPLING ASSEMBLY

This application is divisional of U.S. patent application Ser. No. 10/328,707 filed Dec. 23, 2002 now U.S. Pat. No. 7,404,582 B2.

FIELD OF THE INVENTION

The present invention relates to a coupling system for conduit and pipe that contain electrical cable or wiring, more particularly, a conduit coupling assembly for connecting multiple lengths of electrical conduit in coaxial relationship, particularly for carrying insulated electrical cable.

BACKGROUND OF THE INVENTION

The present invention relates to a conduit coupling assembly for connecting multiple lengths of conduit in coaxial or end-to-end relationship. It is a conventional practice in many types of pipe or conduit systems, and particularly in electrical systems employing tubular conduits that contain electrical wires or cables, to connect a number of lengths of conduit in end-to-end relation through means of couplings so as to form a continuous conduit system as necessary for a particular application. In the case of thin wall conduit, which is primarily employed for encasing electrical cable or conductor wires in applications where the conduit will not be subjected to large stresses, compression fittings or coupling assemblies may be employed which are swaged or otherwise affixed to adjacent ends of conduit lengths. The conduit is generally available in different lengths and may be quite readily formed to various bend contours and coupled end-to-end through the compression couplings or coupling assemblies.

One known technique for connecting lengths of conduit in coaxial or end-to-end relationship is to provide external threads of standard size on the opposite ends of each length of conduit and then connect the lengths of conduit through coupling assemblies. Those coupling assemblies have internal threads, which enable threaded connection with adjacent ends of the conduit lengths to form a structurally sound and electrically sound connection. One known coupling assembly for coupling lengths of conduit is disclosed in commonly assigned U.S. Pat. No. 4,957,314 to Basile et al. The coupling assembly disclosed in the Basile et al. patent requires specially manufactured components, including outer and inner coupling assemblies that must be first installed on each length of conduit before the lengths of conduit can be coupled together. More specifically, the coupling assembly utilizes outer and inner coupling members having threaded ends for threading onto the ends of the lengths of conduit. The outer coupling member is threaded or screwed on to one end of one length of conduit and the inner coupling member is threaded or screwed onto one end of the other length of conduit. The lengths of conduits are then axially aligned and the inner coupling member is inserted into the outer coupling member. The inner coupling member is firmly held in the outer coupling member by set screws disposed on the outer coupling member.

Other known coupling assemblies are disclosed in commonly assigned U.S. Pat. Nos. 4,547,004 to Goldberg and 4,592,574 to Vollmuth et al. Similar to the coupling assembly disclosed in the Basile et al. patent, the coupling assemblies disclosed in the Goldberg and Vollmuth et al. patents require specially manufactured components, including outer and inner coupling members that must be first installed on one length of conduit before the lengths of conduit can be coupled together. Those outer and inner coupling members have threaded ends and the lengths of conduit are subsequently joined by rotating the outer coupling member to thread or screw it onto the other end length of conduit.

Another known technique for connecting lengths of conduit is to provide lengths of conduit with built in set screw assemblies. More specifically, each length of conduit includes a receiving end having an enlarged bell portion or increased diameter that is shaped and configured to receive the insertion end of another length of conduit. In addition, set screws are disposed in apertures located on the bell portion and are used to mechanically hold the insertion end in the bell portion. During installation, the insertion end is positioned in the bell portion and the set screws in the bell portion are advanced or tightened until it engages the insertion end to firmly hold the insertion end in the bell portion. Such a coupling assembly has many advantages over other known techniques for connecting lengths of conduit. For example, such a coupling assembly eliminates the need for multiple components, such as outer and inner coupling members. Thus, the increased cost and time associated with the inventory, shipping, and factory and field installation of the multiple components is eliminated.

Even though those built in set screw coupling assemblies have many advantages over other known techniques for connecting lengths of conduit, improvements in those set screw coupling assemblies are needed. For example, a need exists for a built in set screw coupling assembly that (1) reduces the amount of time needed to tighten the screws or bolts during the conduit installation process, (2) reduces or eliminates the amount of offset typically caused when several conduits are assembled and joined together, (3) reduces or eliminates the amount of dimpling or denting that may occur on the insertion end of the length of conduit when the set screws are tightened, (4) reduces or eliminates the possibility that a set screw will vibrate loose from the tightened position, (5) increases the mechanical connection between the lengths of conduit, and (6) increases the safety of the conduit system by eliminating or reducing any damage of the electrical cable at the connection joint between the length of conduit. Those improvements, among others, are found in the present invention.

BRIEF SUMMARY OF THE INVENTION

Briefly, the present invention is a coupling system for connecting multiple lengths of conduit in coaxial or end-to-end relationship. Each length of conduit includes an insertion end and, at the other end, a bell portion that is shaped and configured to receive the insertion end of another length of conduit. To assemble the lengths of conduit in coaxial relationship, the insertion end of one length of conduit is inserted or positioned into the bell portion of another length of conduit. To provide an improved mechanical connection between the insertion end and the bell portion, the difference between the inner diameter of the bell portion and the outer diameter of the insertion end is less than 0.060 inches and the nominal length of the bell portion is at least 3 inches. Reducing the difference between the inner diameter and the outer diameter results in reduced gap or space between the insertion end and the bell portion when the insertion end is positioned in the bell portion. In turn, the reduced gap or distance substantially reduces or eliminates the amount of offset typically caused when several conduits are assembled and joined together. Thus, several conduits joined together will define a relatively straight line.

To secure the length of conduit together, the bell portion of each length of conduit contains a built in set screw or bolt assembly. The bell portion contains threaded rivets for receiving set screws. The threaded rivets are disposed in apertures positioned on the bell portion. Once the insertion end is inserted into the bell portion, the lengths of conduit are secured together by tightening the set screws until the bottom of the set screws contacts the insertion end. The set screws contain thread profiles that measure between 4 and 12 threads per inch and lengths between about 0.5625 and 0.450 inches. Because the present invention incorporates this improved set screw design, only about a ¼ to 1½ turn of the set screw is needed to adequately tighten the set screw. In addition, as a result of the improved set screw design, the head of the set screw fits firmly and securely on the rivet and the contacting surface of the set screw fits firmly and securely on the outer surface of the insertion end of the conduit when the required amount of torque to adequately tighten the set screw is reached. Moreover, the improved design enables an operator to quickly and efficiently tighten the screw against the outer surface of the insertion end of the conduit. In addition, the improved design eliminates the guesswork in determining whether the set screw is in the locked or tightened position and in determining whether enough torque has been applied to adequately tighten the set screw. Furthermore, the improved design substantially reduces or eliminates the possibility of any dimpling or denting that may occur on the insertion end caused by over tightening the set screw and substantially reduces or eliminates the possibility that the set screw will vibrate loose from the tightened position.

These and other important features of the present invention may best be understood with reference to the accompanying drawings and in the following detailed description of the invention.

BRIEF DESCRIPTION OF THE DRAWING

The foregoing aspects and many of the advantages of the present invention will become readily appreciated by reference to the following detailed description of the preferred embodiment, when taken in conjunction with the accompanying drawings, wherein:

FIG. 3 is a cross-sectional view depicting the insertion end of one length of conduit positioned in and mechanically coupled to the receiving end of another length of conduit;

DETAILED DESCRIPTION OF THE INVENTION

Figure 1:
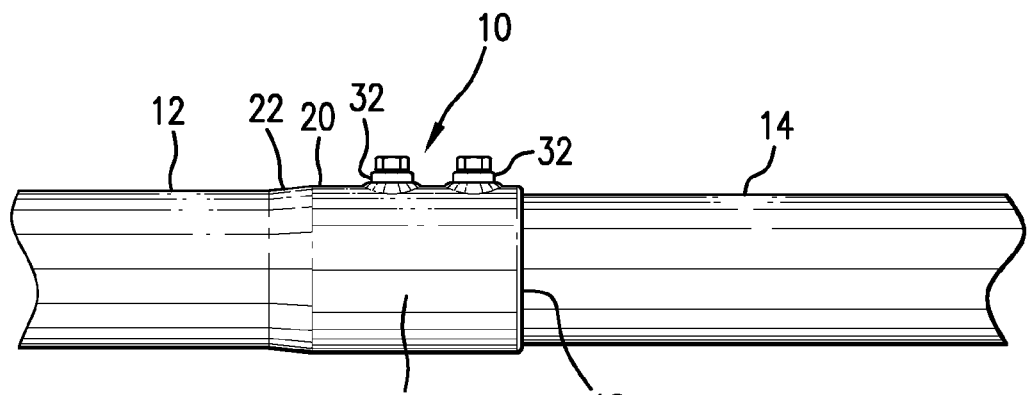
FIG. 1 depicts two lengths of conduit in coaxial relationship wherein the insertion end of one length of conduit is positioned in the receiving end of another length of conduit.
Figure 2:
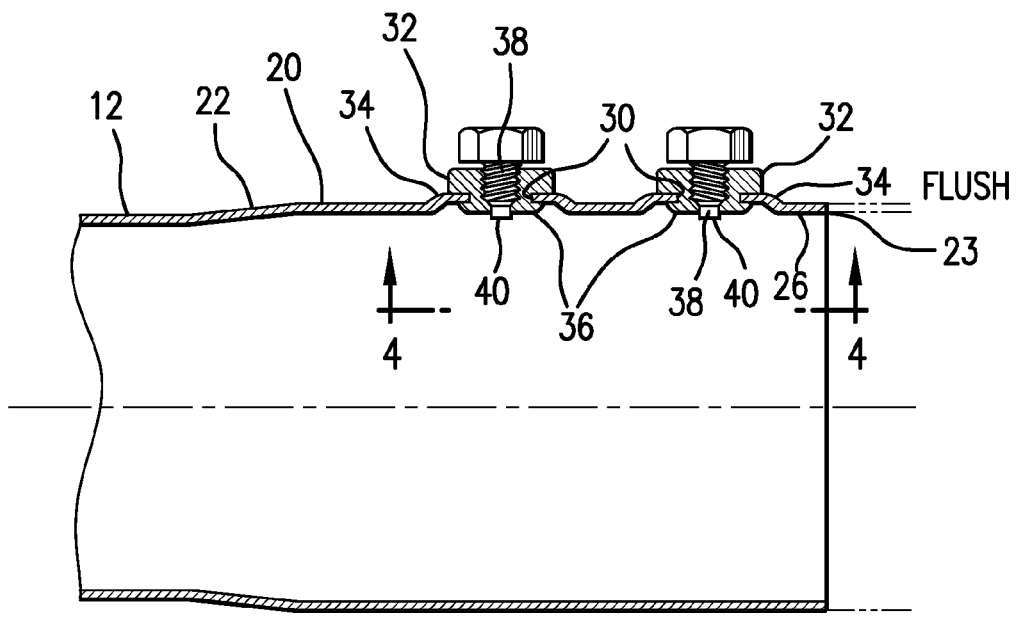
FIG. 2 depicts a cross-sectional view of the receiving end of one length of conduit.

For a better understanding of the present invention, reference may be had to the following detailed description taken in conjunction with the accompanying drawings. FIG. 1 depicts a coupling assembly 10 for connecting a pair of lengths of conduit 12, 14 in coaxial relationship. The lengths of conduit 12, 14 are preferably of the same outer diameter and have insertion ends 16 and receiving ends 18. Each receiving end 18 is defined by a bell portion 20. Referring to FIG. 2, the diameter of the insertion end 16 transitions into the diameter of the bell portion 20 at a transition run 22.

As shown in FIG. 3, the bell portion 20 has an inner diameter slightly larger than the outer diameter of the insertion end 16, and the bell portion 20 is shaped and sized to receive the insertion end 16 during assembly of the lengths of conduit 12, 14. The transition run 22 serves as an abutment for limiting the extent that the insertion end 16 can be inserted into the bell portion 20. Preferably, the insertion end 16 and the bell portion 20 are sized such that when the insertion end 16 is inserted into the bell portion 20, the gap or distance between an outer surface 24 of the insertion end 16 and an inner surface 26 of the bell portion 20 is minimized or reduced. To minimize that gap or distance between the outer surface 24 and the inner surface 26, the difference or tolerance between the inner diameter of the bell portion 20 and the outer diameter of the insertion end 16 should be less than 0.060 inches. More preferably, the distance between the two diameters is about 0.025 inches. The reduced gap or distance between the outer surface 24 of the insertion end 16 and the inner surface 26 of the bell portion 20 provides for an improved mechanical fit between the two lengths of conduit 12, 14. Moreover, the reduced gap or distance reduces or eliminates the dimpling that may occur on the insertion end 16 when the lengths of conduit 12, 14 are coupled (as explained in detail below). In addition, the reduced gap or distance provides better overall geometry that reduces the amount of time needed to tighten the screws or bolts during the conduit assembly process (as explained in detail below). Furthermore, the reduced gap or distance between the outer surface 24 of the insertion end 16 and the inner surface 26 of the bell portion 20 reduces or eliminates the amount of offset typically caused when several conduits are assembled and joined together. As a result, the several conduits joined together will be substantially aligned in co-axial relationship and the central axes of the several conduits will define a relatively straight line.

Figure 4:
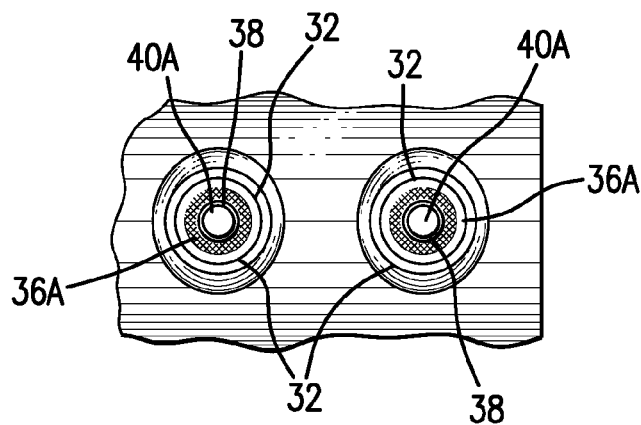
FIG. 4 an enlarged bottom view depicting the inside surface of the rivets and the contacting surface of the set screws utilized in the present invention.

Referring back to FIG. 2, the bell portion 20 has at least one aperture 30 formed therethrough. If the bell portion 20 has more than one aperture 30, the apertures 30 may be radially and/or longitudinally aligned on the bell portion 20. In the preferred embodiment, the bell portion 20 has two regularly spaced apertures 30 which are longitudinally aligned on the bell portion 20. Rivets 32 are fixedly secured within the apertures 30. Each aperture 30 may be located on a raised boss or crest 34 so that when the rivets 32 are disposed or seated within the apertures 30, the inside surface 36 of the rivets 32 sit substantially flush with the inner surface 26 of the bell portion 20 (depending on the gap existing between the outer surface 24 of the insertion end 16 and the inner surface 26 of the bell portion 20). Each rivet 32 is threaded to receive a set screw 38. The set screws 38 may be of the type which can be advanced using an Allen wrench or may have any other suitable extending head for engagement by a suitable wrench, screwdriver, or the like. As shown in FIG. 4, the inside surface 36A of the rivets 32 and/or a contacting surface 40A of the sets screw(s) 38 may contain a serrated pattern or other suitable pattern to provide frictional engagement between the rivets 32 and/or the set screw(s) 38 with the outer surface 24 (not shown) of the insertion end 16. In addition, the outside surface of the rivets 32 and the underside surface of the head of the set screw(s) 38 may also contain a serrated pattern or other suitable pattern to provide enhanced frictional engagement between the outside surface of the rivets 32 and the underside surface of the head of the set screws 38. Such a construction provides a positive locking between the rivets 32 and the set screws 38 when the set screws 32 are in a tightened position and further avoids the set screws 38 from vibrating loose from that tightened position during vibration of the interconnected lengths of conduits 12, 14.

During assembly of multiple lengths of conduit 12, 14, as shown in FIG. 3, the insertion end 16 is positioned into the bell portion 20 until the insertion end 16 abuts the transition run 22. The set screws 38 are then tightened to mechanically couple the lengths of conduit 12, 14 together. The apertures 30 containing the set screws 38 should be located a sufficient distance from the transition run 22 and the edge 23 of the length of conduit so that when the set screws 38 are tightened, any dimpling that may occur on the insertion end 16 will be reduced or eliminated. Preferably, the center of the apertures 30 containing the set screws 28 are located at least 0.8125 inches from the end 39 of the transition run 22, preferably between about 1.3125 and 1.8125 inches from the transition run 22. In addition, center of the apertures containing the set screws 28 are located at least 0.8125 inches from the edge 23 of the length of conduit.

Preferably, each set screw 38 is a 5/16 set screw with a double or triple lead thread, or any suitable broad thread design. In addition, the set screw 38 preferably contains a thread profile 41 that measures between 4 and 12 threads per inch and a length 42 between about 0.5625 and 0.450 inches, preferably 0.450 inches. The thread profile 41 and the length 42 of each set screw 38 should be dimensioned such that only about ¼ to 1½ turn of the set screw 38 is needed to adequately tighten the set screw 38. In addition, the length 42 should be sized so that when the required amount of torque to adequately tighten the set screw 38 is reached, the head of the set screw 38 fits firmly and securely on the rivet 32 and the contacting surface 40 of the set screw 38 fits firmly and securely on the outer surface 24 of the insertion rod 16. Accordingly, only about ¼ to 1½ turn of the set screw 38 is needed before the set screw 38 fits firmly and securely on the outer surface 24 of the insertion rod 16. Preferably, the torque required to adequately tighten the set screw 38 is between about 50 to 130 in-lb. Such a construction enables an operator to quickly and efficiently tighten the screw 38 against the outer surface 24. Moreover, such a construction substantially eliminates the guesswork in determining whether the set screw 38 is in the locked or tightened position and in determining whether enough torque has been applied to adequately tighten the set screw 38. Furthermore, such a construction reduces or eliminates the possibility that any dimpling may occur on the insertion end 16 caused by over tightening the set screw 38 and reduces or eliminates the possibility that the set screw 38 will vibrate loose from the tightened position.

Referring back to FIG. 3, the nominal length 39 of the bell portion 20 (i.e., the distance from the edge of the length of conduit on the receiving end to the transition run 22) should measure greater than 3.0 inches, and preferably measures between 3.5 and 4.0 inches to provide the most efficient mechanical fit. Increasing the length 39 of the bell portion 20 results in an increase in the amount of surface area of the bell portion 20 in contact with the insertion end 16. In turn, an increase in surface area contact provides an improved mechanical connection between the insertion end 16 and the bell portion 20.

Figure 5A:
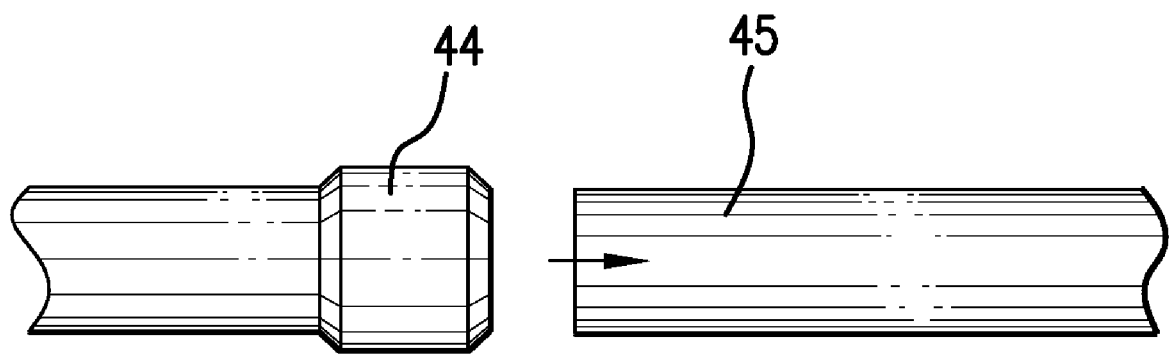
FIG. 5A depicts an end expander prior to insertion in the length of conduit.
Figure 5B:
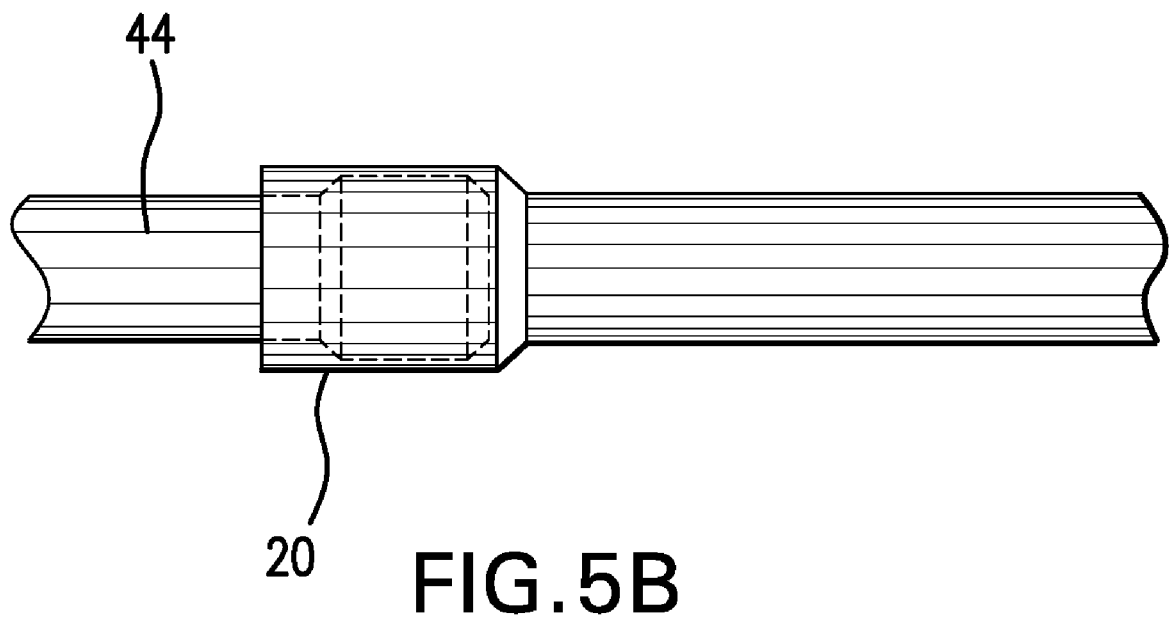
FIG. 5B depicts an end expander inserted in a length of conduit forming a bell portion.

In the preferred embodiment, the bell portion 20 is manufactured using a conduit end expander 44. The end expander 44 is inserted into an unexpanded conduit length 45 (FIG. 5A) until a bell portion 20 having a desired length is formed (FIG. 5B). Preferably, the end expander 44 is sized and configured to form a bell portion 20 having a nominal length of at least three inches. After the bell expansion step, the conduit is loaded or transferred to a multitask station 46. At the multi-task station 46, the conduit is fixedly held while the multi-task station 46 performs the following tasks on the conduit: forming the apertures 30 and the raised crests 34 in bell portion 20; placing and clinching the rivets 32 into the apertures 30; and placing and tightening the set screws 38 into the rivets 32. Preferably, the conduit is fixedly held in front of the multi-task station 46 by electromagnets or other suitable methods.

Figure 6:
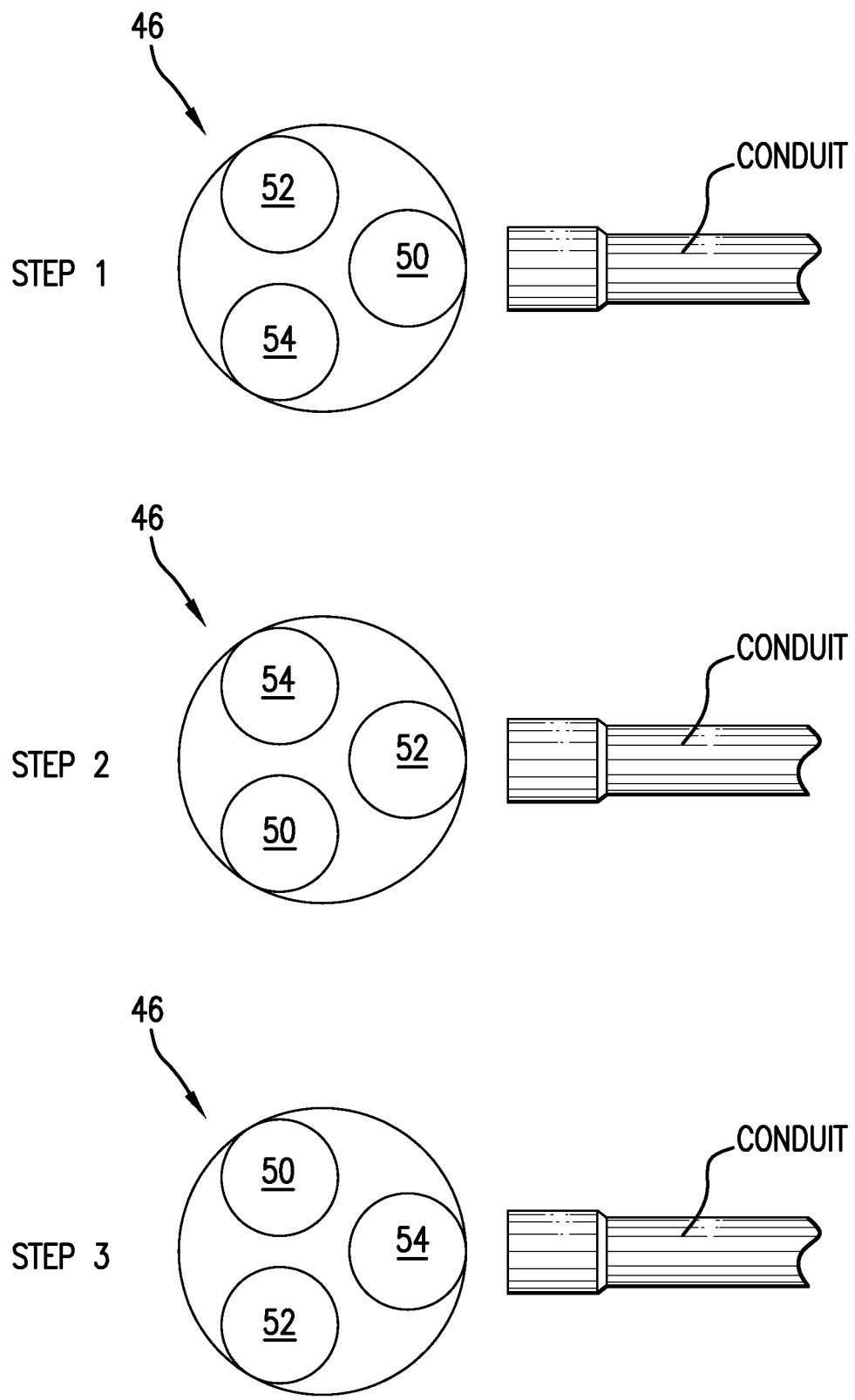
FIG. 6 is a schematic of an exemplary embodiment of the multi-task station used to manufacture the length of conduit.

As illustrated in FIG. 6, the multi-task station 46 is preferably a rotating table. With such a construction, the three aforementioned tasks can be performed on the conduit without having to move or reposition the conduit. For instance, in Step 1, a punch machine 50 located on the rotating table is positioned in front of the conduit. The punch machine 50 forms or punches the apertures 30 in the bell portion 20 and forms the raised crests 34 in the bell portion. In Step 2, the rotating table rotates 120° until a rivet machine 52 is positioned in front of the conduit. The rivet machine 52 places and clinches the rivets 32 into the apertures 30. In Step 3, the rotating table rotates 120° until a set screw machine 54 is positioned in front of the conduit. The set screw machine 54 places the set screws 38 into the rivets 32 and tightens the set screws 38 such that the set screws 38 will not vibrate loose during the shipping of the conduit. After the above tasks are performed on the conduit, the conduit is transferred to a finishing station where the conduit is prepared for shipping to end-users in the field.

Figure 7:
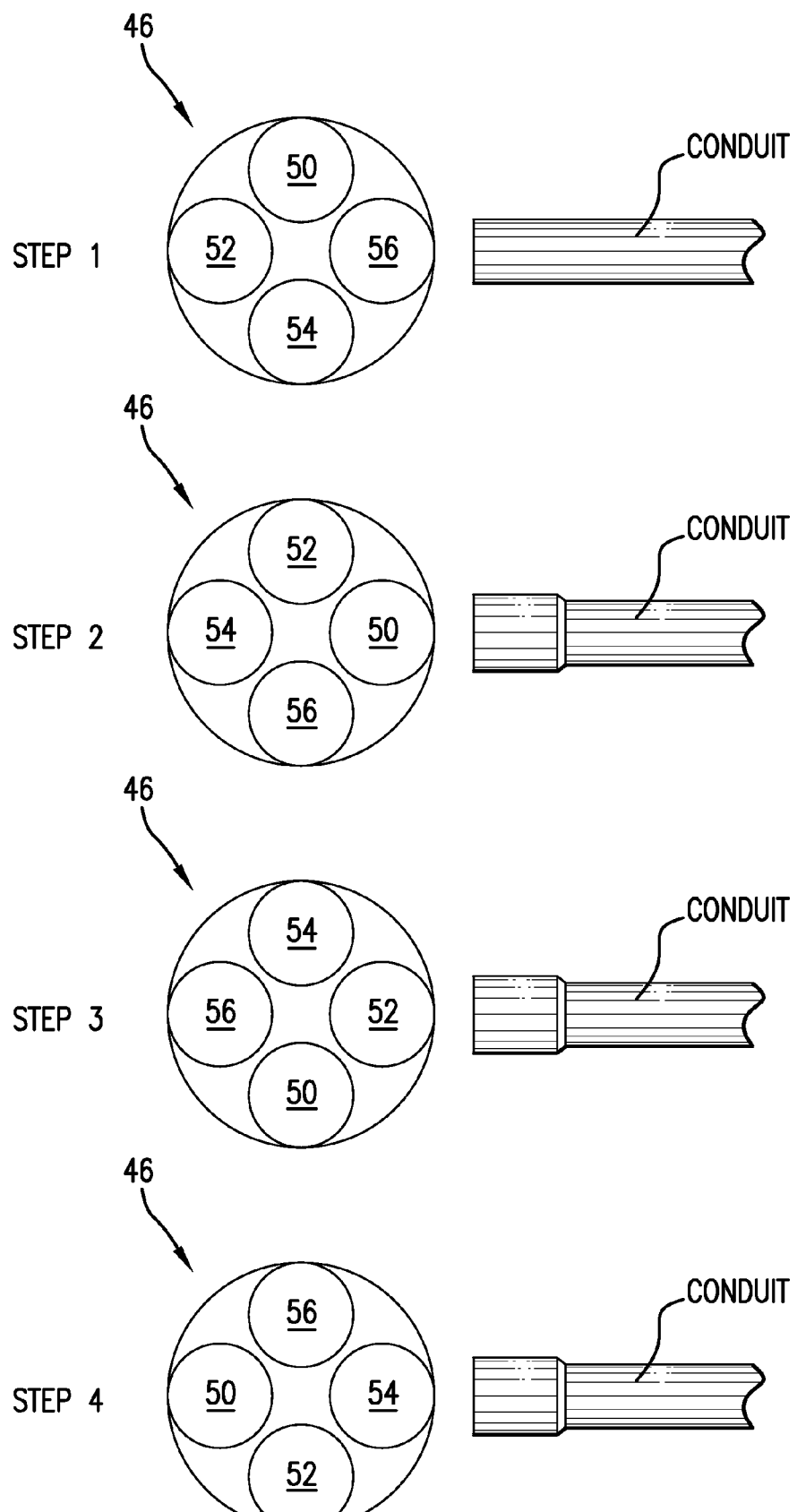
FIG. 7 is a schematic of another exemplary embodiment of the multi-task station used to manufacture the length of conduit.

In another embodiment, the multi-task station 46 may also be configured to perform the bell expansion step. With such a construction, all four aforementioned tasks can be performed on the conduit without having to move or reposition the conduit. For instance, as illustrated in FIG. 7, in Step 1, end expander machine 56 located on the rotating table is positioned in front of the conduit. The end expander machine 56 forms a bell portion 20 having a desired length and shape in the conduit. In Step 2, the rotating table rotates 90 degrees until the punch machine 50 is positioned in front of the conduit. The punch machine 50 forms or punches the apertures 30 in the bell portion 20 and forms the raised crests 34 in the bell-portion. In Step 3, the rotating table rotates 90 degrees until the rivet machine 52 is positioned in front of the conduit. The rivet machine 52 places and clinches the rivets 32 into the apertures 30. In Step 4, the rotating table rotates 90 degrees until the set screw machine 54 is positioned in front of the conduit. The set screw machine 54 places the set screws 38 into the rivets 32 and tightens the set screws 38 such that the set screws 38 will not vibrate loose during the shipping of the conduit. After the above tasks are performed on the conduit, the conduit is transferred to a finishing station where the conduit is prepared for shipping to end-users in the field.

In the foregoing specification, the present invention has been described with reference to specific exemplary embodiments thereof. It will be apparent to those skilled in the art, that a person understanding this invention may conceive of changes or other embodiments or variations, which utilize the principles of this invention without departing from the broader spirit and scope of the invention. The specification and drawings are, therefore, to be regarded in an illustrative rather than restrictive sense.

The invention claimed is:

1. A method of manufacturing a coupling assembly for connecting lengths of conduit for containing electrical cable comprising the steps of:

forming a bell portion in a length of conduit with a bell expender
forming at least one aperture and at least one raised crest in the bell portion;
placing and securing a rivet in the at least one aperture;
placing a set screw in the rivet whereby the outside surface of the rivet contacts the bottom contacting surface of the head of the set screw to provide frictional engagement between the rivet and the set screw when the set screw is in the tightened position, effective to achieve tightening with ¼ to 1 ½ turns, wherein the length of the set screw and the thread profile of the set screw allow the set screw to be tightened with 50-130 in-lb. of torque without dimpling an end of inserted conduit.

2. The method of manufacturing a coupling assembly of claim 1 wherein the bell portion is formed in a first end of the conduit, the bell portion having a inner diameter, the conduit having a second end with an outer diameter, the difference between the inner diameter and the outer diameter is less than 0.060 inches.

* * * * *